United States Patent Office 3,552,027
Patented Jan. 5, 1971

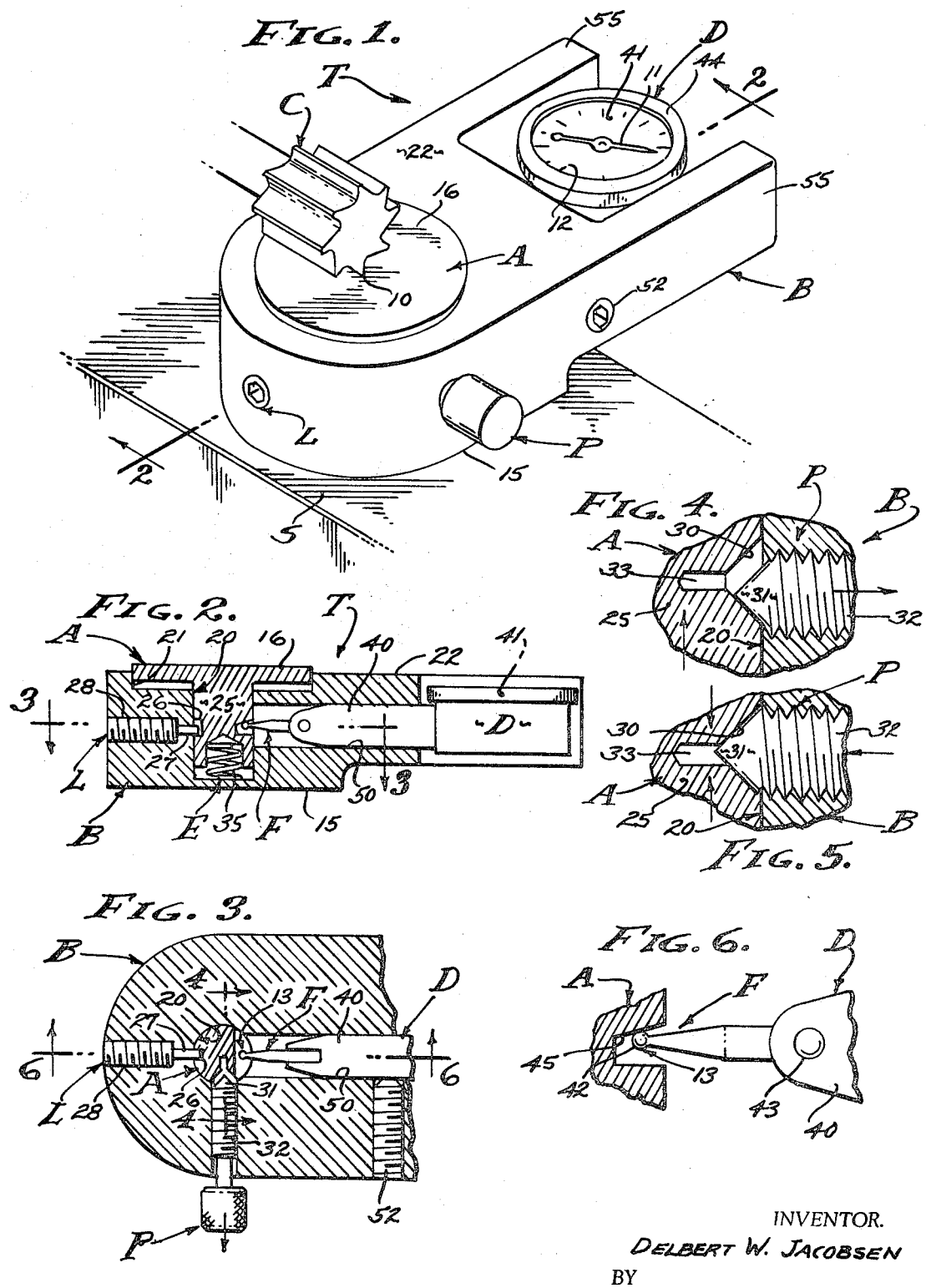

3,552,027
TARGET FOR NUMERICALLY CONTROLLED MACHINE TOOLS
Delbert W. Jacobsen, Los Angeles, Calif., assignor to Astro Tool Co., Inc., Hawthorne, Calif., a corporation of California
Filed Nov. 12, 1968, Ser. No. 774,973
Int. Cl. B27g 23/00
U.S. Cl. 33—185         9 Claims

ABSTRACT OF THE DISCLOSURE

This invention relates to the establishment of an axis or reference plane in the operational setting up of machine tools, whereby a cutter or the like is oriented to a workpiece that is to be machined thereby. More particularly, a target instrument is provided to be seated upon a measurement surface and measurably depressed through positioning engagement with the cutter to an exacting measurable position for the establishment of the desired axis or reference plane, and following which the instrument is further depressed so as to be released from its positioning engagement with the cutter that remains oriented thereby. With this target instrument a precision dial indicator is useable to its ultimate capability in accurately establishing said cutter-to-work relationship, and with the greatest facility.

---

The machining of parts is practiced in various ways and one fundamental method of machining to dimension is to offset the cutting tool from a known base plane. The present state of the art utilizes computerized equipment for this purpose and refers to this method of machining as "numerical control machining" and it is this type of machining that is adapted to be fully automated and/or tape controlled. A characteristic feature of numerical control machining is the placement of the cutting tool in relation to one or more axes, and basically two right angularly related axes X and Y are involved. It is in this way that the machined part is finished through the application of positive offset dimensioning from reference planes, for example a front or back plane X and a right or left plane Y; and there can also be a horizontal plane Z when required. In any case, it is the initial establishment of these planes which is the problem, it being necessary to set up the machine tool with a cutter having its cutting edge or edges related dimensionally to these planes. And, it is this initial set-up of cutting edges to the reference axes which is difficult and time consuming, it being an object of this invention to provide an accurate target facilitating these set-ups.

Numerical tape controlled machining is adapted to a wide variety of machine tools, wherein carriages and/or tables move upon ways and the like to shift workpieces and cutters in dimensional relation to each other. And it is these machine tools within which the various axes or dimension planes must be established, relative to the workpiece to be finished. It is not good practice, nor is it permitted, for a machinist to move a cutter edge into engagement with the machine tool frame or any such directly related part. Likewise, workpiece fixtures should not be so directly engaged by a cutter edge, all for the obvious reason that damage is likely to be inflicted on either or both the permanent structure and cutter. Therefore, it is the practice to establish targets which are usually improvised as particular circumstances require, and it is to these ends that the present invention provides a target instrument that establishes an axis or reference plane that is remote from any permanent structure.

Specifically, it is an object of this invention to provide a target instrument of the character referred to that is retractile and such that it can be withdrawn from planar positioning of a cutter edge and thereby be extracted from an axis establishing position, all without frictional and/or abrading engagement of the said cutter therewith. The target instrument hereinafter disclosed is measurably depressible in calibrated increments, while it is also extensible to and beyond an exacting predetermined position. With the present invention a cutter engageable anvil is provided and which is operable within predetermined limits to move in parallel relation to a base plane. In practice therefore, the machine tool, workpiece and/or fixture therefor is provided with a suitable measurement surface upon which the base plane of the target instrument can be temporarily seated while establishment of the axis or reference plane is effected.

The various objects and features of this invention will be fully understood from the following detailed description of the typical preferred form and application thereof, throughout which description reference is made to the accompanying drawings, in which:

FIG. 1 is a perspective view of the target instrument in working position to establish placement of a cutter in a machine tool.

FIG. 2 is a sectional view taken as indicated by line 2—2 on FIG. 1.

FIG. 3 is a sectional view taken as indicated by line 3—3 on FIG. 2.

FIG. 4 is an enlarged detailed sectional view of a portion of the instrument and taken as indicated by line 4—4 on FIG. 4.

FIG. 5 is a view similar to FIG. 4 showing a different positioning of the instrument.

FIG. 6 is an enlarged detailed fragmentary view taken substantially as indicated by line 6—6 on FIG. 3.

The target instrument T is shown in FIG. 1 supported upon a measurement surface S and being engageably depressed by a cutting edge 10 of a cutter C. As shown, the anvil A remains extended and is not depressed into the body B, in which case the pointer 11 of the dial indicator D is retracted say for example .015 inch, as is indicated. In this respect, an exact predetermined positioning of the anvil A results in advancing of the pointer 11 to a zero position 12. And, it is the establishment of an axis X, Y or Z when the pointer 11 indicates zero 12 that is sought for, and all at an offset distance from any machine tool or fixture structure. To this end therefore, the body B depressibly carries the anvil A so that it is extensible from a predetermined exacting position, and in this respect the body B has a base plane 15 and the anvil A has a reference plane 16, said two planes remaining parallel at all times. In accordance with the invention the said predetermined exacting positioning is, for example, a precise one inch measurement between the planes 15 and 16, and from which the planes 15 and 16 are separably extensible .015 inch in two directions; there being limit means L provided to restrict extensibility and retractibility, there being centering means P provided to place the anvil at said predetermined exacting position, there being extension means E provided to project the anvil from the body, and there being measurement means F provided to adjustably engage the feeler 13 of the dial indicator D or like instrument. As illustrated, these cooperatively related and independent means are associated in one target instrument T, utilitarian with machine tools and the like to be disposed between any measurement surface S and any cutting edge 10, as circumstances may require. A typical situation is presented in FIG. 1 where the cutter C is revolved on a cutting axis that is parallel to the measurement surface S.

The body B is provided for its framework and protection capabilities, and wherein the various elements or parts and means of the target instrument are associated as will be described in each instance. Fundamentally, the body B is provided with a base plane 15 which is an accurately finished planar surface adapted to have precision engagement upon any complementary measurement surface S. And, according to the invention a guide 20 is formed in the body to extend in a direction precisely normal to the plane 15. In practice, the guide 20 is a bore disposed on what will be termed the center axis of the instrument.

The anvil A is provided for shifting into and out of engagement with any part, such as the cutting edge 10, and is what will be termed the extensible part of the instrument. The anvil can take on a variety of shapes and is shown as a simple disc-shaped part, in which case there is a concentric recess 21 in the body to receive and accommodate the anvil. In practice, the anvil retracts into the recess and presents on its surface the reference plane 16 which is disposed at all times above the top 22 of the body. The anvil is then supported for extensibility along the above said axis of the body, by means of a shaft 25 that has a precision sliding fit in the guide 20. The shaft 25 extends precisely normal from the plane 16, and said plane is formed with a precision surface for engagement with complementary precision surfaces of the cutter or tool or like element.

The limit means L that restricts extensibility and retractibility also functions to prevent rotation of the anvil A while maintaining its assembly with the body B. In its preferred form the means L involves a key and limiting keyway, the keyway 26 being formed as an elongated slot in the shaft 25 of the anvil, and the key 27 being inserted through the body B in the form of a dog-pointed set screw. As shown, the set screw 28 is seated in the body B and its dog point projects into the bore of guide 20 to engage in the elongated slot in the side wall of the shaft 25. The slot-shaped keyway 26 accommodates the key 27 without rotation of the shaft 25 and limits reciprocal longitudinal movement of the shaft, for example, to .015 inch in either direction from a center position. For example, in FIG. 1 the anvil is shown in its extended up position, as limited by the means L.

The centering means P that places the anvil A at the said predetermined exacting position will be referred to as a centering device, in that it both raises and lowers the anvil from the limits imposed by the means L. It is to be observed that a feature of the present invention is the permissive movement of the anvil A both upwardly and downwardly with respect to the body B and with respect to said centered position effected by the means P; and this makes possible the particularly utilitarian practicality of this target instrument T. Specifically, it is this feature which makes possible the measured depression of the cutter C and anvil A to a reference plane, followed by further (manual) depression of the anvil A to clear the cutter C for removal of the target instrument from the machine tool and workpiece set-up therein. To these ends therefore, the centering means P involves a cam and wedge, the cam 30 being formed in the side wall of shaft 25 of the anvil and the wedge 31 being inserted through the body B in the form of a pointed set screw. As shown, the set screw 32 is threaded into the body B on an axis normal to the axis of shaft 25 and its wedge end is conically pointed so as to present both top and bottom inclined surfaces as best illustrated in FIGS. 4 and 5. In accordance with the invention, the cam 30 is complementary to the wedged end point of the set screw and presents equally angular faces adapted to seat flat and simultaneously with the top and bottom surfaces of the wedge 31. In practice, the double cam 30 is established in the side wall of shaft 25 by forming a conical recess therein, for example a 90° cone in which case the wedge 31 is also a 90° cone, and there being a clearance hole 33 at its center to accommodate the point of the wedge 31 without interference. Therefore, when the wedge 31 is released as shown in FIG. 4, the anvil A is permitted to rise (or fall) as it is depicted in FIGS. 1 and 2. However, when the wedge 31 is moved into full engagement with the cam 30 the shaft 25 of anvil A is centered to the required exacting predetermined position as shown in FIG. 5. And when in this latter centered position the dial indicator D can be set to a zero indication.

The extension means E that projects the anvil A from the body B is preferably a spring 35 that yieldingly urges the anvil A upwardly with respect to the body B, in order to extend the dimensional distance between measurement planes 15 and 16. As shown, the spring 35 is captured within the assembly of the anvil and body and has its opposite ends compressibly seated upon the anvil and body respectively.

The measurement means F that adjustably engages the feeler 13 of the dial indicator D is an adjustment that adapts said dial indicator to the reading of precise measurements related to the spacing of measurement planes 15 and 16. Although dial indicators vary in construction and outward configuration, they can be generally considered to have a mounting stem or barrel 40 with a laterally movable feeler 13 at one end and with a readout dial 41 at the other end. A typical dial indicator D is shown wherein the feeler 13 is a lever having an actuable ball contact 42 at its terminal end and a pivot 43 in the barrel, and to the end that mechanism therein (not shown) incrementally advances and/or retracts the pointer 11 to indicate incremental positions on the dial 41, for corresponding incremental lateral displacements of the contact 42. Thus, at a certain lateral displacement of the contact 42 the dial indicator D will read zero 12. To these ends therefore, the measurement means F involves an inclined actuating face 45 associated with the anvil A and a reciprocally adjustable mount 50 for the indicator barrel 40. The actuating face 45 is formed in the shaft 25 and as best illustrated in FIG. 6 is horizontally disposed as it extends transversely with respect to the indicator barrel axis, and is inclined upwardly as it extends radially from the shaft 25 axis. Therefore, movement of the contact 42 to and from, or radially of the axis of shaft 25 causes lateral displacement of said contact. The adjustable mount 50 is shown as a bore on an axis normal to the shaft 25 axis. The bore is in open communication with the guide 20 bore and is formed to slideably receive the indicator barrel 40, there being a set screw 52 locking the barrel in any reciprocally selected position. As indicated, the dial indicator D has an adjustment in the bezel 44 thereof that is revolvable, and all to the end that suitable adjustments are made to bring the pointer 11 to the zero 12 when the centering means P is operated to center the measurement planes 15 and 16 at said precise one inch dimension.

From the foregoing it will be clear how to operate the target instrument T for the purposes intended, and any such related purposes. The instrument is inherently of rugged and stable design, with body extensions 55 to embraceably protect the dial indicator D. As clearly shown in FIG. 3 the various correlated means are angularly disposed about the axis of shaft 25 which is integral with the anvil A as the one movable part of the instrument. As a result, a durable and reliable instrument is provided, wherein the anvil can be engaged by the cutting edge 10 of a cutter C or the like, and depressed to a precise predetermined position with respect to a measurement surface S, the dial indicator D reading zero 12 for example. Having accurately established said predetermined positioning, the target instrument T is subsequently depressible by further manipulation and removable from said interengagement. And, at any time the dial indicator reading is to be verified, it is a simple matter to operate the centering means P for its centering function that re-establishes the required exacting measurement between the measurement planes 15 and 16.

Having described only a typical preferred form and application of my invention, I do not wish to be limited or restricted to the specific details herein set forth, but wish to reserve to myself any modifications or variations that may appear to those skilled in the art:

Having described my invention, I claim:

1. A target instrument for the placement of precisely prepositioned spaced and parallel dimensional planes, and including, a body having a base plane for support upon a measurement surface and with a guide disposed normal to said base plane, an extensible and retractible anvil having a reference plane for engagement with a part to be positioned and with a shaft slideably carried in the guide, said base plane and said reference plane remaining parallel and being oppositely faced, extension means yieldingly extending the anvil from the body, limit means restricting extensile and retractile movement of the anvil with respect to the body, releasable centering means positioning the anvil at a precisely known placement between said base and reference planes and intermediate the limits of extensile and retractile movement of the anvil, and measurement means indicating positioning of the anvil at said precisely known placement when depressed thereto by engagement of said part, said anvil being depressible from said precisely known placement for release from said measurement surface and positioned part.

2. The target instrument as set forth in claim 1 wherein the limit means that restricts extensile and retractile movement of the anvil comprises a key projecting from the body and into the guide and slideably engaged in a slotted keyway of limited longitudinal extent in the shaft of the anvil.

3. The target instrument as set forth in claim 1 wherein the limit means that restricts entensile and retractile movement of the anvil comprises a set screw seated in the body and with a dog point projecting from the body and into the guide and slideably engaged in a slotted keyway of limited longitudinal extent in the shaft of the anvil.

4. The target instrument as set forth in claim 1 wherein the releasable centering means positioning the anvil comprises a cam on the anvil shaft engaged by a selectively positioned wedge carried in the body.

5. The target instrument as set forth in claim 1 wherein the releasable centering means positioning the anvil comprises a cam with opposed oppositely inclined faces on the anvil shaft engaged by complementary inclined surfaces on a selectively positioned wedge carried in the body.

6. The target instrument as set forth in claim 1 wherein the releasable centering means positioning the anvil comprises a cam with equally divergent upwardly and downwardly inclined faces on the anvil shaft engaged by complementary inclined surfaces of a selectively positioned cone-pointed set screw carried in the body.

7. The target instrument as set forth in claim 1 wherein the measurement means indicating position of the anvil comprises a dial indicator with a feeler displaceable laterally from a mounting axis therefor in the body and engageable with a transversely disposed actuating face on the anvil shaft to indicate position of the anvil with respect to the body.

8. The target instrument as set forth in claim 1 wherein the measurement means indicating position of the anvil comprises a dial indicator with an extended feeler displaceable laterally from a mounting axis therefor in the body, said mounting axis being normal to the axis of the anvil shaft, and said feeler being engageable with a downwardly disposed actuating face extending transversely of the anvil shaft to indicate position of the anvil with respect to the body.

9. The target instrument as set forth in claim 1 wherein the measurement means indicating position of the anvil comprises a dial indicator with an extended feeler displaceable laterally from a mounting axis therefor in the body, said mounting axis being normal to the axis of the anvil shaft, and said feeler being engageable with a downwardly disposed actuating face on and extending transversely of and inclined outwardly and upwardly from the axis of the anvil shaft and shiftable on said mounting axis to indicate position of the anvil with respect to the body.

References Cited

UNITED STATES PATENTS

| 211,975 | 2/1879 | Dickinson | 33—147(G) |
| 1,431,615 | 10/1922 | Wittner | 33—178(A) |
| 2,462,545 | 2/1949 | Penjaska | 33—178(A) |
| 2,601,496 | 6/1952 | Boat | 33—178(A) |
| 2,746,161 | 5/1956 | Budnick | 33—185 |

WILLIAM D. MARTIN, Jr., Primary Examiner

U.S. Cl. X.R.

33—147, 169